United States Patent [19]
Rasoul et al.

[11] Patent Number: 6,084,023
[45] Date of Patent: Jul. 4, 2000

[54] OXAZOLINE OR OXAZINE COATING COMPOSITIONS

[75] Inventors: Husam A. A. Rasoul; Jody L. Svoboda, both of Racine, Wis.

[73] Assignee: S. C. Johnson Commercial Markets, Inc., Sturtevant, Wis.

[21] Appl. No.: 09/413,671

[22] Filed: Oct. 6, 1999

[51] Int. Cl.⁷ .................................................. C08F 271/02
[52] U.S. Cl. ........................... 524/530; 526/260; 525/279
[58] Field of Search ........................... 525/279; 526/260; 524/530

[56] References Cited

U.S. PATENT DOCUMENTS

| | | | |
|---|---|---|---|
| 3,692,757 | 9/1972 | Dowbenko | 260/86.1 |
| 4,247,671 | 1/1981 | Reitz et al. | 526/260 |
| 4,508,869 | 4/1985 | Keskey et al. | 524/808 |
| 4,592,930 | 6/1986 | Schmidt et al. | 427/133 |
| 5,656,679 | 8/1997 | G. F. Hutter | 523/161 |

OTHER PUBLICATIONS

H. A. A. Rasoul, et al., "Oxazoline Hydrolysis, Synthesis and Polymerization as a New Oxazoline Methacrylate", Polymer Preprints, ACS, pp. 871–872 (1997).

Rasoul et al., Polymer Preprint, 38 (1), 871–872.

*Primary Examiner*—Bernard Lipman
*Assistant Examiner*—Caixia Lu-Rutt
*Attorney, Agent, or Firm*—Renee J. Rymarz and Neil E. Hamilton

[57] ABSTRACT

A coating composition which is capable of crosslinking at ambient and elevated temperatures which includes a polymerized monomer having the formula

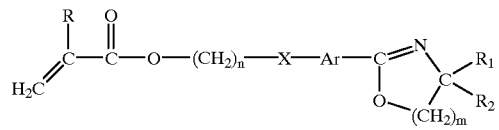

wherein R is hydrogen or an alkyl group containing 1–5 carbon atoms, $R_1$ and $R_2$ are hydrogen or a methyl group; —X— is a bond, —O— or —NH—; Ar is unsubstituted arylene; n is 0–10 and m is 1 or 2; wherein when X is O or NH, n is at least 1. A process for preparing the composition suspensions is also presented. The coating composition is useful in coatings, inks, overprint, varnish and surface treatment applications.

16 Claims, No Drawings

OXAZOLINE OR OXAZINE COATING COMPOSITIONS

BACKGROUND OF THE INVENTION

This invention relates to an aqueous coating composition such as coatings, inks, overprint varnishes, and surface treatment applications containing an oxazoline or oxazine polymer. More particularly it relates to such a coating which is self curable at room temperatures.

BACKGROUND ART

One component thermosetting aqueous coating compositions are in demand for a number of applications where chemical resistance is needed. Self curing polymer latexes are known for example, latexes containing glycidyl (meth) acrylate-amine and latexes containing acetoacetoxyethyl methacrylate-amine systems. Other systems such as oxazoline-carboxylic acid in which the acid and oxazoline groups react under certain conditions to form an ester-amide are also known. Compositions containing a blend of an oxazoline containing polymer and an acid containing group are known, one such system is described in U.S. Pat. No. 4,592,930 (Schmidt et al.). Polymer latexes containing both oxazoline and acid pendent groups are also known. U.S. Pat. No. 4,508,869 discloses a polymer latex prepared in a two-stage emulsion process. The first stage of polymerization contains the acid monomer and the second stage containing the oxazoline monomer. These polymers are based on an aliphatic oxazoline monomer 2-isopropenyl-2-oxazoline. Aliphatic oxazolines in general are less stable than oxazolines containing an aryl moiety in conjunction with the oxazoline group.

U.S. Pat. No. 4,247,671 to Reitz et al. discloses another aliphatic oxazoline containing monomer specific for use in a hydrocured thermoset polymer with cyclic carboxylic anhydrides.

Oxazoline methacrylate monomers having an aryl moiety in conjunction with the oxazoline group are also known. See H. A. A. Rasoul et al., Polymer Preprint vol. 38, No. 1, pages 871 and 872 (1997).

It is also known in the art to employ acid functional resins and a support resin in emulsion polymerization. U.S. Pat. No. 5,656,679 discloses such process using rosin ester-amide support resins for acrylic latexes.

The prior art does not provide a latex composition which is self curing at room temperature wherein one of the monomers include an aryl moiety in conjunction with an oxazoline or oxazine group. In addition, the prior art does not provide a latex composition which is self curing at room temperature wherein one of the monomers include an aryl moiety in conjunction with the oxazoline or oxazine group prepared using acid functional resins as a support resin.

SUMMARY OF THE INVENTION

A latex composition is provided which is self crosslinking at room temperatures and which includes (a) a water soluble or dispersible support resin containing pendent acid groups which are capable of reacting with an oxazoline or oxazine group to form a covalent bond thereto, (b) an oxazoline, or oxazine having the formula:

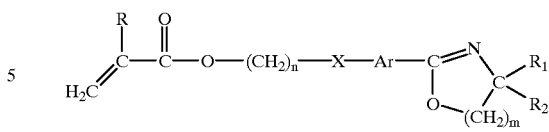

Wherein R is hydrogen or an alkyl group containing 1–5 carbon atoms; $R_1$ and $R_2$ are hydrogen or a methyl group; —X— is a bond, —O— or —NH—; Ar is unsubstituted arylene; n is 0 to 10 and m is 1 or 2; wherein when X is O or NH, n is at least 1; and (c) at least one other addition polymerizable monomer which does not contain a coreactive or oxazoline or oxazine group.

Optionally, at least one conventional anionic or nonionic surfactant in about 0.1 to about 5% based on the monomer weight will be added to the resin solution or dispersion before the addition of the monomer mixture.

A process for preparing a latex composition as previously described is also provided which includes a water soluble or water dispersible support resin containing an acid group, the process comprising the steps of (a) forming a solution or a dispersion of an acid functional resin (b) adding to the resin a mixture of monomers comprised of (1) an oxazoline or oxazine monomer having the above formula I and (2) at least one other ethylenically unsaturated monomer and (c) polmerizing the monomer mix under conditions such that the oxazoline or oxazine monomer, and the one other monomer, are polymerized in the presence of resin solution or dispersion containing acid groups.

The preparation of the referred to oxazoline and oxazine compounds in the previous Formula I are described in application Ser. No. 09/041,059 filed Mar. 10, 1998, which teachings are incorporated herein by reference.

The Examples which follow are intended as an illustration of certain preferred embodiments of the invention and no limitation of the invention is implied.

The following Examples 1A and 1B illustrate the preparation of water dispersible resins. All indicated percentage amounts in these Examples, as well as those following, are by weight as well as all indicated parts.

EXAMPLE 1A

Resin A

A resin comprised of about 34% alpha-methyl styrene, 33% acrylic acid, and 33% styrene was prepared by methods described in U.S. Pat. No. 4,529,787. This resin had an acid number of about 215 and Tg of about 95 C. The weight average molecular weight was about 8500.

EXAMPLE 1B

Resin B

A resin comprised of about 50% methyl methacrylate, 10% acrylic acid, 25% styrene and 15% butyl acrylate was prepared by methods described in the previously referred to U.S. Pat. No. 4,529,787. This resin had an acid number of about 78 and Tg of about 69 C. The weight average molecular weight was about 15000.

The following Examples, 2A and 2B, illustrate the preparation of dispersions using Resin A and B, respectively.

EXAMPLE 2A

Resin A Dispersion

Resin A (200 parts), 28% aqueous ammonia (46.54 parts), and deionized water (467.75 parts) were charged to a round bottom flask equipped with a stirrer, a condenser, and a thermometer. The mixture was heated to 85° C. until all the resin was dispersed (about 1 hour). The resultant product had pH of 7.8 viscosity of 135 cps.

EXAMPLE 2B

Resin B Dispersion

Resin B (200 parts), 28% aqueous ammonia (12.66 parts), and deionized water (501.62 part) were charged to a round bottom flask equipped with a stirrer, a condenser, and a thermometer. The mixture was heated to 85° C. until all the resin was dispersed (about 1 hour). The resultant product had pH of 8.1 viscosity of 85 cps.

The following Examples 3–5 illustrate the preparation of an emulsion polymer containing pendent aromatic oxazoline groups for use as a self crosslinking coating.

EXAMPLE 3

A 500 ml 4 neck round bottom flask was equipped with a mechanical stirrer, a condenser, and a thermometer. This flask was charged with 142.51 parts of the resin A dispersion as prepared in Example 2A, and deionized water (58 parts). The flask and its contents were heated to 80° C. A mixture of 42.53 parts of methyl methacrylate, 9.45 parts of 2-(4-ethoxyphenyl)-2-oxazolinyl methacrylate, and 42.53 parts butyl acrylate was prepared. An Initiator solution was prepared by dissolving ammonium persulfate (0.76 parts) in deionized water (4.24 parts) and added to the hot contents of the flask. After 3 minutes, the mixture of monomers was added. This addition was completed in 60 minutes. The emulsion polymer was held for an additional 60 minutes at 80° C. after the end of the feed. The final emulsion was cooled and filtered. The emulsion had a pH of 8.0, a viscosity of 80 cps (0.08 pascal.seconds) at room temperature, and percent solids of 43. The number average particle size was 38 and the weight average particle size was 44.

EXAMPLE 4

A 500 ml 4 neck round bottom flask was equipped with a mechanical stirrer, a condenser, and a thermometer. This flask was charged with resin A dispersion (142.51 parts), and deionized water (58 parts). The flask and its contents were heated to 80° C. A mixture of 37.8 parts of methyl methacrylate, 18.9 parts of 2-(4-ethoxyphenyl)-2-oxazolinyl methacrylate, and 37.8 parts butyl acrylate was prepared. An Initiator solution was prepared by dissolving ammonium persulfate (0.76 parts) in deionized water (4.24 parts) and added to the hot contents of the flask. After 3 minutes, the mixture of monomers was added. This addition was completed in 60 minutes. The emulsion polymer was held for additional 60 minutes at 80° C. after the end of the feed. The final emulsion was cooled and filtered. The emulsion had a pH of 7.8, a viscosity of 185 cps (0.185 pascal.seconds) at room temperature, and percent solids of 44. The number average particle size was 55 and the weight average particle size was 57.

EXAMPLE 5

A 500 ml 4 neck round bottom flask was equipped with a mechanical stirrer, a condenser, and a thermometer. This flask was charged with resin A dispersion (115.38 parts), and deionized water (45 parts). The flask and its contents were heated to 80° C. A mixture of 13.88 parts of methyl methacrylate, 13.88 parts of 2-(4-ethoxyphenyl)-2-oxaxolinyl methacrylate, 13.88 parts styrene and 27.77 parts butyl methacrylate was prepared.

An Initiator solution was prepared by dissolving ammonium persulfate (0.57 parts) in deionized water (4.23 parts) and added to the hot contents of the flask. After 3 minutes, the mixture of monomers was added. This addition was completed in 60 minutes. The emulsion polymer was held for an additional 60 minutes at 80 C after the end of the feed. The final emulsion was cooled and filtered. The emulsion had a pH of 7.9, a viscosity of 81 cps (0.082 pascal.seconds) at room temperature, and percent solids of 44. The number average particle size was 43 and the weight average particle size was 47.

COMPARATIVE EXAMPLE 6

This emulsion polymer contains no pendent aromatic oxazoline group and was prepared for comparison with Examples 3, 4, and 5. A 500 ml 4 neck round bottom flask was equipped with a mechanical stirrer, a condenser, and a thermometer. This flask was charged with resin A dispersion (142.51 parts), and deionized water (58 parts). The flask and its contents were heated to 80° C. A mixture of 47.25 parts of methyl methacrylate, and 37.8 parts butyl acrylate was prepared.

An Initiator solution was prepared by dissolving ammonium persulfate (0.76 parts) in deionized water (4.24 parts) and added to the hot contents of the flask. After 3 minutes, the mixture of monomers was added. This addition was completed in 60 minutes. The emulsion polymer was held for an additional 60 minutes at 80° C. after the end of the feed. The final emulsion was cooled and filtered. The emulsion had a pH of 8.0, a viscosity of 77 cps (0.077 pascal.seconds) at room temperature, and percent solids of 44. The number average particle size was 37 and the weight average particle size was 39.

The following Examples 7–9 illustrate the preparation of additional emulsion polymers containing pendant aromatic oxazoline group prepared for use as self crosslinking coatings.

EXAMPLE 7

A 500 ml 4 neck round bottom flask was equipped with a mechanical stirrer, a condenser, and a thermometer. This flask was charged with resin B dispersion (138.68 parts), deionized water (74 parts), and (1.46 parts) Siponate DS-10 which is a surfactant. The flask and its contents were heated to 78° C. A mixture of 23.76 parts of styrene, 15.84 parts of 2-(4-ethoxyphenyl)-2-oxazolinyl methacrylate, and 39.6 parts 2-ethylhexyl acrylate was prepared. An Initiator solution was prepared by dissolving ammonium persulfate (1.2 parts) in deionized water (5.72 parts) and added to the hot contents of the flask. After 3 minutes, the mixture of monomers was added. This addition was completed in 60 minutes. The emulsion polymer was held for an additional 90 minutes at 85° C. after the end of the feed. The final emulsion was cooled and filtered. The emulsion had a pH of 8.36, and percent solids of 39.5. The number average particle size was 64 and the weight average particle size was 75.

EXAMPLE 8

A 500 ml 4 neck round bottom flask was equipped with a mechanical stirrer, a condenser, and a thermometer. This flask was charged with resin B dispersion (138.68 parts), deionized water (74 parts), and Siponate DS-10 (1.46 parts). The flask and its contents were heated to 78° C. A mixture of 23.68 parts of methyl methacrylate, 15.79 parts of 2-(4-ethoxyphenyl)-2-oxazolinyl methacrylate, and 39.47 parts 2-ethylhexyl acrylate was prepared. An Initiator solution was prepared by dissolving ammonium persulfate (1.2 parts) in deionized water (5.72 parts) and added to the hot contents of the flask. After 3 minutes, the mixture of monomers was added. This addition was completed in 60 minutes. The emulsion polymer was held for an additional 2 hours, 1 hour at 78° C. and the $2^{nd}$ hour at 85° C. after the end of the feed. The final emulsion was cooled and 60 parts of deionized water was added. The emulsion was then filtered. The emulsion had a pH of 8.58, and percent solids of 32.75. The number average particle size was 82 and the weight average particle size was 108.

EXAMPLE 9

A 500 ml 4 neck round bottom flask was equipped with a mechanical stirrer, a condenser, and a thermometer. This flask was charged with resin B dispersion (138.68 parts), deionized water (74 parts), and Siponate DS-10 (1.46 parts). The flask and its contents were heated to 80° C. A mixture of 23.68 parts of methyl methacrylate, 15.79 parts of 2-(4-ethoxyphenyl)-2-oxazolinyl methacrylate, and 39.47 parts butyl acrylate was prepared. An Initiator solution was prepared by dissolving ammonium persulfate (1.2 parts) in deionized water (5.72 parts) and added to the hot contents of the flask. After 3 minutes, the mixture of monomers was added. This addition was completed in 60 minutes. The emulsion polymer was held for an additional 2 hours, at 80° C. after the end of the feed. The final emulsion was cooled and 60 parts of deionized water was added. The emulsion was then filtered. The emulsion had a pH of 8.43, and percent solids of 39.57.

COMPARATIVE EXAMPLE 10

This emulsion polymer contains no pendant aromatic oxazoline group and was prepared for comparison with Examples 7, 8 and 9. A 500 ml 4 neck round bottom flask was equipped with a mechanical stirrer, a condenser, and a thermometer. This flask was charged with resin B dispersion (582.45 parts), deionized water (240.21 parts), (5.48 parts) Triton X-100 which is a surfactant and Siponate DS-10 (2.74 parts). The flask and its contents were heated to 78° C. A mixture of 171.36 parts of styrene, and 1171.36 parts 2-ethylhexyl acrylate was prepared. An Initiator solution was prepared by dissolving ammonium per sulfate (1.71 parts) in deionized water (17.0 parts) and added to the hot contents of the flask. After 3 minutes, the mixture of monomers was added. This addition was completed in 60 minutes. An additional solution of ammonium persulfate (0.69 parts in 7 parts of water) was added after the monomers feed was completed. The emulsion polymer was held for 1 hour at 78° C. after the end of the feed. The emulsion was then filtered. The emulsion had a pH of 8.2, a viscosity of 935 cps (0.935 pascal.seconds) at room temperature, and percent solids of 43. The number average particle size was 51 and the weight average particle size was 55.

The following Examples 11 and 12 illustrate formulations of coatings employing the polymers of Example 3–10.

EXAMPLES 11–14

Emulsion polymers in Examples 3–6 were formulated in clear coating formulation by the addition of butyl cellosove (EB) at 30% based on emulsion solids and a 1% on total weight of a 1% solution of FSN leveling aid. The formulated emulsions were applied on cold rolled steel (CRS) using a #46 wire wound rod. Dry film thickness were measured using an Elcometer. Film thickness were about 0.9–1.2 mil. MEK rubs were performed using a Crockmeter. The following Table shows the comparative results of MEK double rubs.

TABLE 1

MEK Double Rubs of Coating Compositions Derived from Examples 3–6

| Coating Formula | R.T. MEK Double Rubs @ 1 Day | R.T. MEK Double Rubs @ 3 Day | R.T. MEK Double Rubs @ 7 Day | R.T. MEK Double Rubs @ 14 Day | 100 C MEK Double Rubs After 24 hrs. |
|---|---|---|---|---|---|
| Example 11 | 50 | 50 | 30 | — | 60 |
| Example 12 | 150 | 120 | 200 | >250 | >250 |
| Example 13 | 100 | 150 | 150 | 150 | >250 |
| Example 14 | 5 | 5 | 5 | 5 | 5 |

EXAMPLES 15–18

Emulsion polymers in Examples 7–10 were formulated in clear coating formulation by the addition of butyl cellosove (EB) at 15% on solids and a 1% on total weight of a 1% solution of FSN leveling aid. The formulated emulsions were applied on cold rolled steel (CRS) using a #40 wire wound rod. Dry film thicknesses were about 1.0 mil on average. MEK rubs were performed by using a Crockmeter. The following Table shows the comparative results of MEK double rubs.

TABLE 2

MEK Double Rubs of Coating Compositions Derived from Examples 7–10

| Coating Formula | R.T. MEK Double Rubs @ 1 Day | R.T. MEK Double Rubs @ 4 Day | R.T. MEK Double Rubs @ 7 Day | R.T. MEK Double Rubs @ 14 Day | 100 C MEK Double Rubs After 48 hrs. |
|---|---|---|---|---|---|
| Example 15 | 30 | 30 | 30 | 30 | 100 |
| Example 16 | 30 | 30 | 30 | 30 | 100 |
| Example 17 | 30 | 30 | 30 | 30 | 100 |
| Example 18 | 5 | 5 | 5 | 5 | 5 |

As seen from Tables 1 and 2, there is a substantial difference in the MEK double rubs between coating compositions which include the aryl oxazoline moieties (Examples 11–13 and 15–17) and those which do not (Examples 14 and 18).

In addition to the MEK double rubs test, coating films made from compositions containing the aryl oxazoline moieties are insoluble in organic solvents an indication of crosslinked network. Polymer films made from compositions that do not contain the aryl oxazoline are soluble in organic solvent.

Acid functional resins used in this invention include but are not limited to styrene acrylic resins such as those made by S. C. Johnson and Son Inc. Other acid functional resins used as support resins are acid modified rosins, polyamide and polyesters. Styrene acrylic resins can be made by the free radical polymerization of styrene, acrylic or methacrylic acid esters, monomeric alkenes and vinylic monomers in addition to ethylenically unsaturated mono or poly acid monomers. Suitable acid-functional ethylencially unsaturated monomers include but are not limited to acrylic acid, beta-carboxymethyl acrylate, cinnamic acid, crotonic acid, fumaric acid, itaconic acid, maleic acid, methacrylic acid, and mixtures thereof. Suitable aromatic ethylenically unsaturated monomers include but are not limited to styrene, α-methylstyrene, β-methylstyrene, cis-stilbene, trans-stilbene, para-methylstyrene, tert-butylstyrene, vinylnapthalene, and various mixtures and combinations thereof.

The addition of polymerizable monomers used in this invention are aromatic ethylenically unsaturated monomers which include but are not limited to α-olefins; dienes; vinyl esters and ethers; $C_1$ to $C_{20}$ acrylate and methacrylate esters; acrylamides and methacrylamides; vinyl amides; and various mixtures and combinations thereof.

Optional surfactants which can be employed include but are not limited to surfactants/emulsifiers which can be anionic, cationic, nonionic surface-active compounds or mixtures thereof. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethyoxylated alkanols and alkylphenols, as well as esters of sulfosuccinic acid. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof.

Industrial Applicability

The coating compositions of this invention are capable of crosslinking at ambient and elevated temperatures. They are useful as coatings such as inks, floor finishes, paints, overprint varnishes and the like.

What is claimed is:

1. A crosslinking latex composition which is self crosslinking at room temperatures comprising (a) a water soluble or dispersible support resin containing pendent acid groups which are reactive towards with oxazoline or oxazine groups to form a covalent bond thereto, (b) an oxazoline, or oxazine having the formula:

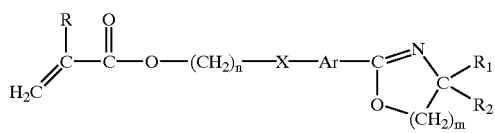

wherein R is hydrogen or an alkyl group containing 1–5 carbon atoms, $R_1$ and $R_2$ are hydrogen or a methyl group; —X— is a bond, —O— or —NH—; Ar is unsubstituted arylene; n is 0–10 and m is 1 or 2; wherein when X is O or NH, n is at least 1; and (c) at least one other addition polymerizable monomer which does not contain a reactive group towards oxazoline or oxazine group.

2. A composition according to claim 1, wherein the oxazoline is 2-(4-ethoxyphenyl)-2-oxazolinyl methacrylate.

3. A composition according to claim 1, wherein the support resin is an acrylic resin.

4. A composition according to claim 1, wherein the support resin is composed of alpha-methyl styrene, acrylic acid and styrene and the addition polymerizable monomer is composed of methyl methacrylate and butyl acrylate.

5. A composition according to claim 1, wherein the support resin is composed of alpha-methyl styrene, acrylic acid and styrene and the addition polymerizable monomer is composed of methyl methacrylate, styrene and butyl methacrylate.

6. A composition according to claim 1, wherein the support resin is composed of methyl methacrylate, acrylic acid, styrene and butyl acrylate and the addition polymerizable monomer is composed of styrene and 2-ethylhexyl acrylate.

7. A composition according to claim 1, wherein the support resin is composed of methyl methacrylate, acrylic acid, styrene and butyl acrylate and the addition polymerizable monomer is composed of methyl methacrylate and 2-ethylhexyl acrylate.

8. A composition according to claim 1, wherein the support resin is composed of methyl methacrylate, acrylic acid, styrene and butyl acrylate and the addition polymerizable monomer is composed of methyl methacrylate and butyl acrylate.

9. A process for preparing a latex composition which is self crosslinking at room temperatures and includes a water soluble or water dispersible support resin containing an acid group and an oxazoline or oxazine group, the process comprising the steps of (a) forming a dispersion of an acid functional resin (b) adding to the resin a mixture of monomers comprised of (1) an oxaoline or oxazine monomer having the formula:

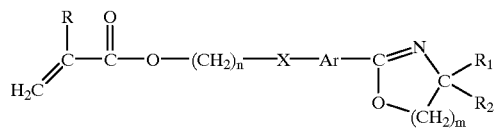

wherein R is hydrogen or an alkyl group containing 1–5 carbon atoms, $R_1$ and $R_2$ are hydrogen or a methyl group; —X— is a bond, —O— or —NH—; Ar is unsubstituted arylene; n is 0–10 and m is 1 or 2; wherein when X is O or NH, n is at least 1; and (2) at least one other ethylenically unsaturated monomer and (c) polymerizing said monomer mix under conditions such that the oxazoline or oxazine monomer, and the one other monomer, are polymerized is the presence of resin solution or dispersion containing acid groups.

10. The process according to claim 9, wherein the oxazoline is 2-(4-ethoxyphenyl)-2-oxazolinyl methacrylate.

11. The process according to claim 9, wherein the support resin is an acrylic resin.

12. The process according to claim 9, wherein the support resin is composed of alpha-methyl styrene, acrylic acid and styrene and the addition polymerizable monomer is composed of methyl methacrylate and butyl acrylate.

13. The process according to claim 9, wherein the support resin is composed of alpha-methyl styrene, acrylic acid and styrene and the addition polymerizable monomer is composed of methyl methacrylate, styrene and butyl methacrylate.

14. The process according to claim 9, wherein the support resin is composed of methyl methacrylate, acrylic acid, styrene and butyl acrylate and the addition polymerizable monomer is composed of styrene and 2-ethyhexyl acrylate.

15. The process according to claim 9, wherein the support resin is composed of methyl methacrylate, acrylic acid, styrene and butyl acrylate and the addition polymerizable monomer is composed of methyl methacrylate and 2-ethylhexyl acrylate.

16. The process according to claim 9, wherein the support resin is composed of methyl methacrylate, acrylic acid, styrene and butyl acrylate and the addition polymerizable monomer is composed of methyl methacrylate and butyl acrylate.

* * * * *